United States Patent [19]

Polzer et al.

[11] Patent Number: 4,685,050

[45] Date of Patent: Aug. 4, 1987

[54] METHOD OF TIGHTENING THREADED FASTENERS

[75] Inventors: Bernhard Polzer, Riesbürg; Johann Roemischer, Lauchheim, both of Fed. Rep. of Germany

[73] Assignee: Deutsche Gardner-Denver GmbH, Westhausen, Fed. Rep. of Germany

[21] Appl. No.: 743,562

[22] Filed: Jun. 11, 1985

[30] Foreign Application Priority Data

Jun. 16, 1984 [DE] Fed. Rep. of Germany ....... 3422522

[51] Int. Cl.4 ...................... G05B 13/02; G05D 17/02

[52] U.S. Cl. ...................................... 364/152; 73/761; 81/467; 173/12; 364/508

[58] Field of Search ............... 364/148, 152, 505, 508, 364/506; 173/1, 2, 12; 73/761, 763, 862.23, 862.24; 29/207, 240; 81/467-470

[56] References Cited

U.S. PATENT DOCUMENTS

| | | | |
|---|---|---|---|
| 4,106,176 | 8/1978 | Rice et al. | 364/508 X |
| 4,245,381 | 1/1981 | Esghy | 173/12 X |
| 4,344,216 | 8/1982 | Finkelston | 364/506 X |
| 4,375,121 | 3/1983 | Sigmund | 364/508 X |
| 4,426,887 | 1/1984 | Reinholm et al. | 364/508 X |

*Primary Examiner*—Joseph Ruggiero
*Attorney, Agent, or Firm*—Walter Ottesen

[57] ABSTRACT

The invention is directed to a method for tightening threaded fasteners by means of a controlled fastener-driving tool. The tightening of the fasteners is controlled by the elastic limit thereof. The slope of the actual load-strain characteristic curve is continuously determined during the fastener-driving operation. This actual slope is compared with a predetermined slope determined with reference to a characteristic curve. When the predetermined slope is reached, a control signal is generated to switch off the fastener-driving tool. In practice, departures occur in the actual characteristic curve of an actual fastener-driving operation. In order to compensate for such departures from the characteristic reference characteristic curve, a comparison is made in the straight portion of the actual load-strain characteristic curve with the predetermined characteristic slope of the reference characteristic curve and a corrective value for transformation of one characteristic curve to the other is formed in the presence of a departure of the slopes. For this purpose, before the actual determined slope is compared with the predetermined switch-off slope one of the two quantities is transformed by means of a corrective value.

11 Claims, 6 Drawing Figures

METHOD OF TIGHTENING THREADED FASTENERS

FIELD OF THE INVENTION

The invention relates to a method of tightening threaded fasteners with a controlled fastener driving tool wherein the tightening of the threaded fasteners is controlled with respect to the elastic limit.

BACKGROUND OF THE INVENTION

A method of the above-mentioned type is disclosed in German published patent application DE-OS No. 17 03 681 and is based upon the realization that the slope of the stress-strain characteristic of a test rod falls off when the elastic limit is reached. The slope which is characteristic for this threaded fastener case can be determined in preliminary tests based on measurements of several like threaded fastener joints. Accordingly, a predetermined slope can be established for which the elastic limit is reached and the fastener driving tool switched off. This switch-off slope is utilized as a switch-off criteria for which the slope of the torque/ rotational-angle characteristic is determined during the fastener driving operation with respect to series fastening. This slope of the torque/rotational-angle characteristic is compared with the predetermined switch-off slope to deliver a control signal to switch off the fastener driving tool when the elastic limit is reached.

A precondition of such a method is that the course of the torque/rotational-angle characteristic for the individual fastener driving operations of a fastener case is for the most part the same. However, in practice there are often large deviations from the assumed characteristic curve to be determined without the fastener connection being defective. In these cases, the elastic limit is not reached or is greatly exceeded which is a disadvantage with respect to the integrity of the fastener connections or with respect to utilizing the threaded fasteners again.

In order to obtain an accurate switch-off of the fastener driving tool when the elastic limit is reached independently of the steepness of the characteristic, it is also known to not only determine the slope of the torque/rotational-angle characteristic in its linear portion as disclosed by the known method, but also to store and to generate a control signal as soon as the measured slope falls off to a predetermined percentage of the stored slope. In this connection, reference may be made to German Pat. No. 23 36 896. This method requires that a great accuracy of measurement be maintained when the slope is determined so that the desired switch-off value can be maintained. Furthermore, without special measures, errors cannot be detected which occur with large deviations from normal fastener driving conditions, for example, wherein the thread strips or a "chewing" of the fastener head occurs and which results in a substantially larger linear slope of the torque/rotational-angle characteristic.

SUMMARY OF THE INVENTION

It is an object of the invention to provide a method of the above-mentioned type wherein the fastener driving operation with the series driving of fasteners is always terminated in every proper situation when the elastic limit is reached without the necessity of having to store the slope measured in each instance.

The method of the invention is for tightening threaded fasteners with a controlled fastener driving tool wherein the tightening is controlled by the elastic limit. The method of the invention includes the steps of: continuously determining the slope of a characteristic curve corresponding to a stress-strain characteristic as an actual value; comparing the actual value with a predetermined slope determined in preliminary tests for a characteristic fastener driving case; and, generating a control signal for terminating the fastener driving operation upon reaching the predetermined slope; and, the further steps of storing the slope ($A_1$, $A_2$) of the characteristic curve of a characteristic fastener driving operation as a reference characteristic curve over its entire course, the reference characteristic curve having a linear slope portion ($A_1$); determining the slope ($A_0$) in the straight portion of the actual-value characteristic curve; comparing the slope ($A_0$) of the actual-value characteristic curve with the linear slope ($A_1$) of the reference characteristic curve; generating a corrective value (K) corresponding to the difference between the slopes ($A_0$) and ($A_1$); utilizing the corrective value to transform one of the slopes ($A_0$, $A_2$) to a characteristic value, the one slope being significant for switching-off the fastener driving operation; and, evaluating the last-mentioned characteristic value for switching off the fastener driving operation.

With the method of the invention, the slope which is to be used as a switch-off criterion is determined with the given reference characteristic curve determined by preliminary tests whereby a directed and precisely defined elongation of the fastener is obtained by providing this switch-off slope. The elastic limit can be precisely determined by the method of the invention since it is determined with the aid of preliminary tests according to all suitable criteria and the values found are transformed on the actual-value characteristic for the series fastening. In this connection, the required corrective value for each fastener driving operation has to be determined only once, namely, after a predetermined threshold value is exceeded in the initial range of the linear slope. The value found for the reference characteristic curve of the switch-off slope is transformed by means of the corrective value on the actual-value characteristic curve of the particular series driving of fasteners.

The same result can also be obtained by reversing the process, that is, the determined actual value of the characteristic curve is transformed on the reference characteristic and a characteristic value is determined which is evaluated in the context of the switch-off slope of the reference characteristic curve. A special advantage of the method according to the invention is that tolerance limits can be applied with the reference characteristic curve which lead to a definitive error indication when such tolerance limits are exceeded.

In another embodiment of the invention, a plurality of reference characteristic curves are stored with the respective switch-off slopes corresponding thereto. In series production, the linear slope of the actual-value characteristic curve is evaluated for each fastener case in such a manner that a suitable reference characteristic curve is selected and thereafter the switch-off slope is determined. In this case, the formation of corrective values for performing transformations of measured or stored values is not required.

BRIEF DESCRIPTION OF THE DRAWING

The invention will now be described in more detail with reference to the accompanying drawing wherein.

DESCRIPTION OF THE PREFERRED EMBODIMENTS OF THE INVENTION

Figure 1:
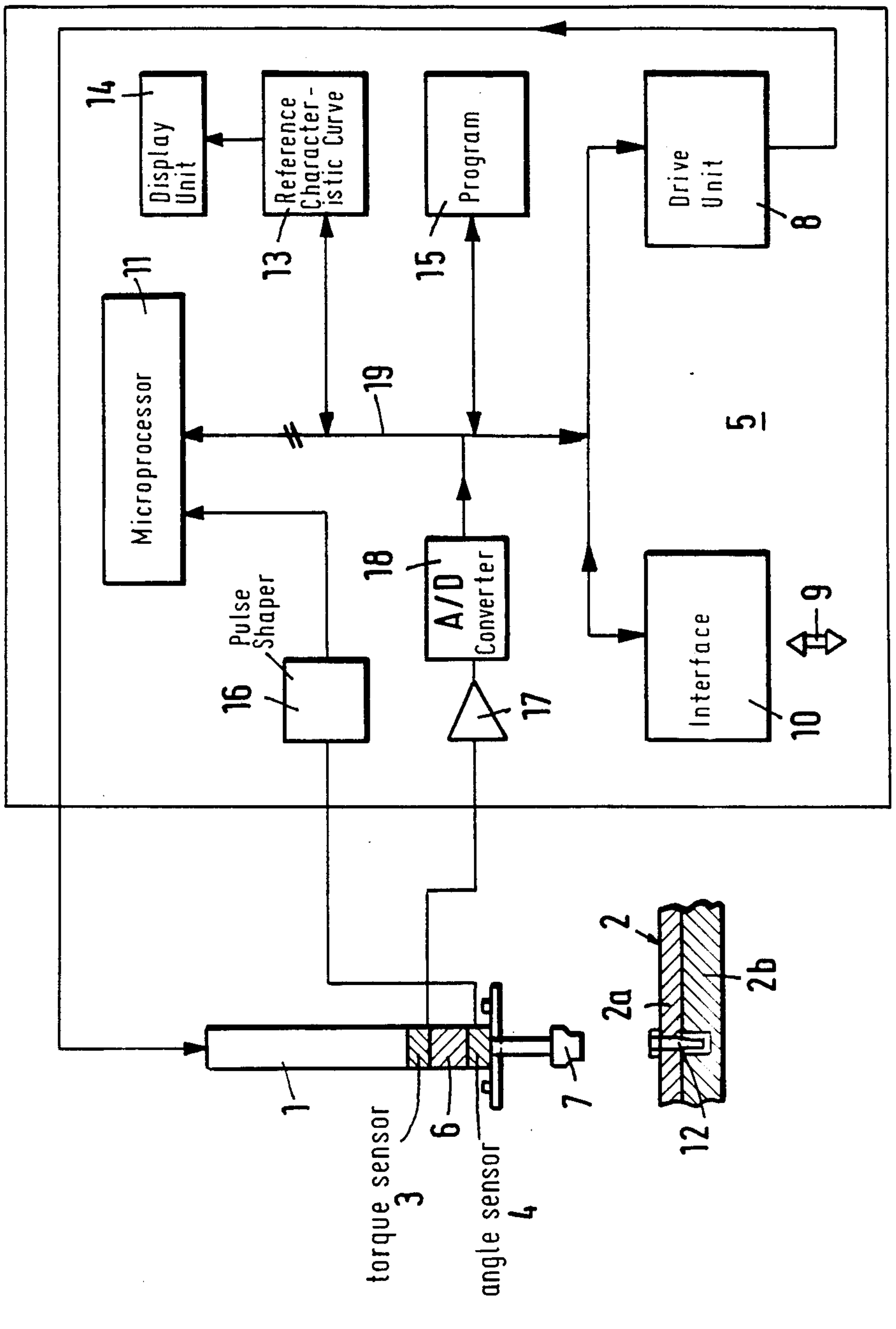
FIG. 1 is a schematic of a fastening-driving tool equipped with a control arrangement for performing the method of the invention.

The fastener-driving tool 1 shown in FIG. 1 is utilized to tighten fastener connections 2 which are made up of two components 2*a* and 2*b* as well as a threaded connecting fastener 12. The fastener-driving tool 1 drives an exchangeable socket 7 via gearing 6. The rotational angle $\phi$ of the head of the threaded fastener increases continuously during the fastener-driving operation and is detected by an angle sensor 4; whereas, the torque M developed during the fastener-driving operation is detected by a torque sensor 3. The measured values are conducted to a control arrangement 5 as electrical output signals.

In the embodiment shown, the fastener-driving tool 1 includes an electric motor which imparts rotary movement to the socket 7 via gearing 6. The motor is monitored by a control unit 8 via which the motor is switched on and switched off under the control of a microprocessor in correspondence to predetermined data in accordance with the fastener-driving operation to be carried out.

When the fastener 12 comes with its head into contact engagement with the upper component part 2*a* as it is rotatively driven and is then rotated further, a tensile force is applied to the shank of the fastener. The shank is strained in the axial direction and a tensile stress is developed therein. A defined relationship exists between the tensile stress and the developed torque M on the one hand and, between the strain and the rotational angle $\phi$ on the other hand.

Figure 2:
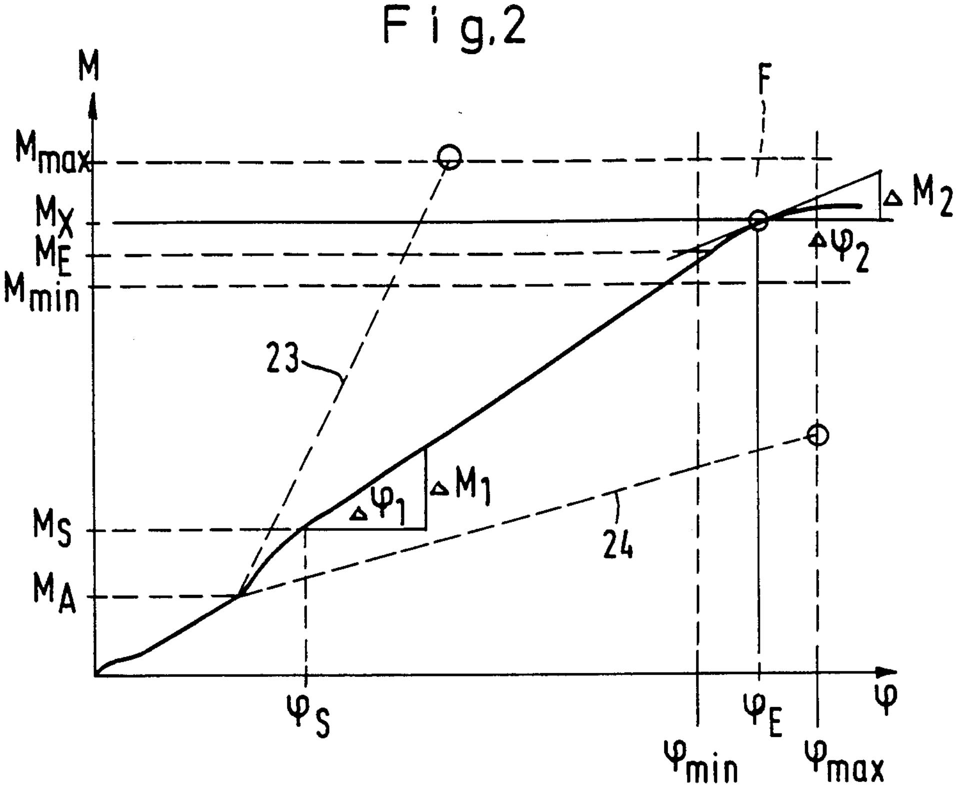
FIG. 2 is a characteristic curve of torque versus rotational angle for a typical fastener case.

The torque M is plotted as a function of rotational angle $\phi$ in FIG. 2. First, the fastener 12 is rotated into the thread which is located in the blind bore of the lower component part 2*b* until the head of the fastener lies against component part 2*a* and the engagement torque $M_A$ is developed by the fastener-driving tool. From a predetermined torque onwards, namely the threshold moment $M_S$, the characteristic curve runs with an approximately constant slope up to an end torque $M_E$. This is the region in which the shank of the fastener elastically deforms. If the fastener is tightened still further, the material will also plastically deform. This is recognizable in the diagram of FIG. 2 wherein it is shown that the slope of the characteristic curve drops off. The tightening operation should be ended with a switching off of the fastener-driving tool or drive motor when the elastic limit is reached which can be basically defined pursuant to two different criteria: on the one hand, the reduction of the slope to a predetermined percentage value can be assumed or, on the other hand, the permissible remaining strain of the material can be assumed pursuant to the so-called offset method, this strain usually being set at a 0.2% enlargement of the initial length of the material which here is the shank of the fastener and is designated as a 0.2% strain limit.

Figure 3:
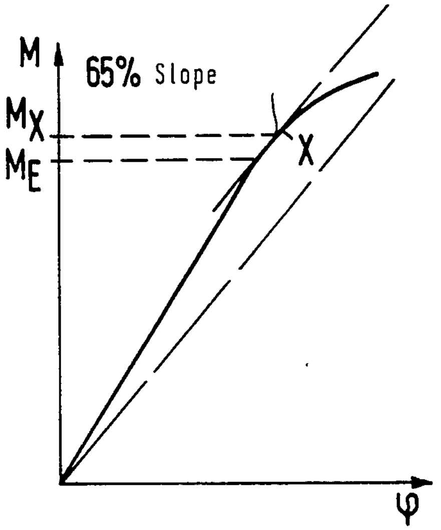
FIG. 3 is a graphical illustration for explaining the determination of the switch-off slope.
Figure 4:
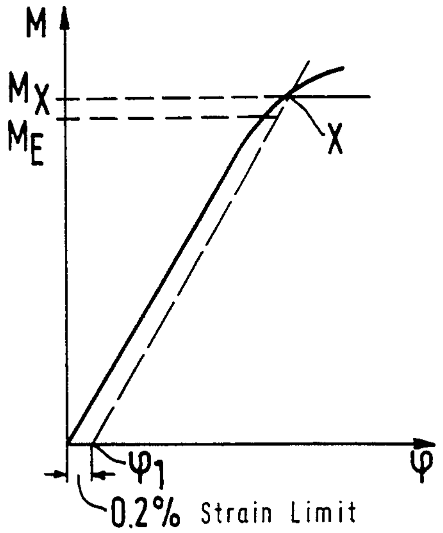
FIG. 4 is a graphic illustration to explain the determination of the switch-off slope pursuant to another embodiment of the method according to the invention.

FIGS. 3 and 4 illustrate how the switch-off value X is determined according to these criteria for a given fastener connection.

Pursuant to FIG. 3, the slope $dM/d\phi$ of the characteristic curve $M(\phi)$ is measured up to and beyond the end value $M_E$ and the switch-off value X is set, for example, to a value of 65% of this slope. This can be seen in this illustration in that a tangent is applied to the curve which is parallel to the straight line which corresponds to 65% of the original slope.

Pursuant to FIG. 4, a straight line is drawn parallel to the slope $dM/d\phi$ in the linear region. The straight line begins at rotational angle $\phi_1$ which is proportional to the elongation of the fastener shank of 0.2% of its initial length with corresponds to a 0.2% strain limit. The point of intersection of both curves is the switch-off value X.

These values can be determined in a test with a fastener connection which corresponds to a series of fastenings to be produced later. The two components 2*a* and 2*b* and the threaded fastener 12 (FIG. 1) have the dimensions and material characteristics provided for the series fastenings. Since the characteristic curves are scattered also for like fastener connections, several such connections belonging to a particular threaded fastener case are measured in a test series. Thereafter, characteristic mean values for the slope of the characteristic curve and for the switch-off value X are determined. The switch-off value X corresponds to a reduced slope which is designated in the following as a "switch-off slope $A_2$"; whereas, the mean slope of the measured fastener connections provides a "reference characteristic curve" having a linear slope $A_1$.

The reference characteristic curve can be determined in the preliminary tests by means of direct measurements of the differential quotient $dM/d\phi$ of the individual characteristic curves. As FIG. 2 shows, the slope $A_1$ in the linear region of the reference characteristic curve is given by:

$$A_1 = \frac{\Delta M_1}{\Delta \phi_1} = \frac{M_E - M_S}{\phi_E - \phi_S}$$

In order to exclude measurement errors which can occur because of disturbances of the straight line course of the characteristic curve, the slope is measured over several sections of the characteristic curve in the preliminary tests as well as later for the series fastening and the mean value of the slope is formed in each of these sections.

Figure 5:
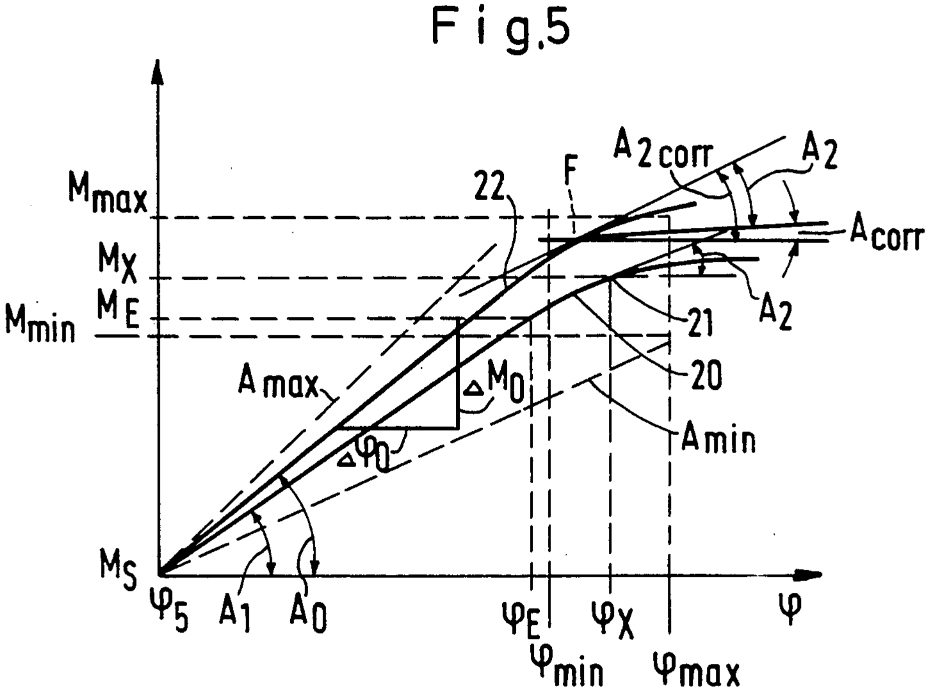
FIG. 5 is a reference characteristic curve with a predetermined switch-off slope and an actual-value characteristic curve as well as tolerance regions; and, FIG. 6 is a reference characteristic curve of a fastener case wherein the fastener is a self-tapping fastener.

FIG. 5 is a reference characteristic curve 20 for a characteristic fastener case which is illustrated as an example. The fall of the slope to the value $A_2$ is reached at point 21 which defines the elastic limit and corresponds to the torque $M_X$. If with series fastening, the characteristic curve of an individual fastening operation coincides with this reference characteristic curve, then the fastener driving operation should be ended by the microprocessor 11 as soon as the slope $A_1$ of the characteristic curve drops to the switch-off slope $A_2$.

Since in practice, the characteristic curves of the individual fastener-driving operations of the same "fastener case" deviate from the reference characteristic curve within permissible tolerance limits, the method of the invention provides that the measuring values are compared with the reference characteristic curve and, in the event of deviations, the measuring values are to be corrected before the evaluation. For this purpose, the data significant for the reference characteristic curve, that is the slope $A_1$ and the switch-off slope $A_2$, are given to the control arrangement 5. And, the actual slope of the characteristic curve of the particular fastener-driving operation, which slope is determined from the measured values of the torque M and the rotational angle $\phi$, is compared with the predetermined switch-off slope $A_2$ for initiating the switch-off only after the switch-off slope $A_2$ is transformed to a value $A_{2corr}$ by means of a one-time correction of the input value. The transformation is derived from a comparison between the determined actual slope of the actual characteristic curve and of the slope $A_1$ (reference characteristic curve).

Before the evaluation by means of a given corrective factor and in lieu of the switch-off value $A_2$, the measured values of the actual-value characteristic curve in proportion to the determined deviation from the slope of the reference characteristic curve can be transformed to values corresponding to the slope $A_1$ of the reference characteristic curve so that a corrected actual-value characteristic curve can be simulated whereby the given predetermined switch-off slope $A_2$ remains unchanged. In both cases, the predetermined desired value X (FIG. 3 or FIG. 4) of the switch-off slope is adapted to the actual value of the linear slope for the particular fastener-driving operation.

In the embodiment according to FIG. 1, the interface unit 10 defines an input-output unit for data. Input data is applied to the control arrangement 5 in the direction of arrow 9 via the interface unit 10 and via a central computer (not shown). These values of a reference characteristic curve of a fastener-driving operation are determined in preliminary tests and are given below:

(1) threshold torque $M_S$ with corresponding rotational angle $\phi_S$;

(2) end torque $M_E$ with corresponding rotational angle $\phi_E$; and, (3) switch-off slope $A_2$.

From the data of (1) and (2), the microprocessor 11 computes the slope $A_1$ of the reference characteristic curve 20 and computes the corresponding switch-off slope $A_2$ pursuant to predetermined values of the drop in slope (FIG, 3 or FIG. 4). Both values are stored in a memory (RAM) 13. The slope $A_1$ of the reference characteristic curve 20 is made visible by means of a display 14.

To reduce the number of computation steps, it can be advantageous to supply to control arrangement 5 only the threshold moment $M_S$ via the input-output unit 10 in lieu of the values of (1) and (2) and to directly supply the slope $A_1$ of the reference characteristic curve determined in preliminary tests as well as the swltch-off slope $A_2$.

The arrangement is ready for operation after the values $A_1$, $A_2$ and $M_S$ have been placed in memory 13. The fastener-driving tool 1 is started by microprocessor 11 via drive unit 8 in correspondence to a program predetermined in the program storage unit 15 (E-PROM). The rotational movement of the socket head 7 is measured by the angle sensor 4 and the measured quantities are transformed into electrical impulses which are conducted to the microprocessor 11 via pulse shaper stage 16. The number of pulses delivered to the microprocessor in a unit of time is proportional to the increase in the rotational angle $\phi$. The output signal of the torque sensor 3 is amplified by means of a measurement amplifier and is conducted to a fast operating analog-to-digital converter whose digital output signal is conducted to microprocessor 11.

The microprocessor 11 is connected via a data bus 19 with the memory 13, the program storage unit 15, the drive unit 8, the input-output unit 10 and the analog-to-digital converter 18.

After a predetermined threshold value $M_S$ is exceeded, the microprocessor 11 continuously evaluates the signals of torque sensor 3 which are supplied thereto and the pulses delivered by angle sensor 4 determine the measuring cycles 4 for the measurement of the slope in the manner of a clock generator. Pursuant to the predetermined program, the slope $A_0$ of the actual-value characteristic curve of the completed fastener-driving operation is determined. This slope is compared with the slope $A_1$ of the reference characteristic curve which is stored in memory 13. The comparator circuit unit (not shown) can be contained within the microprocessor 11. If the determined actual slope $A_0$ departs from the characteristic slope $A_1$ of the reference characteristic curve, a corrective value K is determined from the values $A_0$ and $A_1$, for example, pursuant to the equation:

$$K = A_1/A_0$$

This corrective value is likewise stored and can be utilized in two ways notwithstanding the deviation of the actual-value characteristic curve from the reference characteristic curve to ensure that the switch-off is in the correct switching point X (FIG. 3 or FIG. 4) referred to the actual-value characteristic curve.

Case 1: The slope values $A_0$ of the actual-value characteristic curve are determined after the threshold value is exceeded and the corrective value K is computed. These slope values $A_0$ are multiplied in microprocessor 11 by the corrective value K whereby a transformed characteristic curve is obtained at an output of the microprocessor 11 contained in the data bus 19. This transformed characteristic curve corresponds with respect to its slope to the reference characteristic curve 20. The transformed actual slope $A_{0corr}$ is therefore given by:

$$A_{0corr} = K \cdot A_0$$

As soon as the value $A_{0corr}$ has dropped down to the predetermined switch-off slope $A_2$, the microprocessor 11 switches off the fastener-driving tool 1 via the drive unit 8. The fastener-driving operation is then terminated.

Case 2: By means of the corrective value K, the microprocessor 11 transforms the predetermined switch-off slope $A_2$ stored in memory 13 to the switch-off slope corresponding to the slope $A_0$. This value $A_{2corr}$ is determined by means of a comparison of the two slopes in the straight line portion of the curves and thereafter is calculated pursuant to the following equation:

$$A_{2corr} = A_2/K = A_0/A_1 \cdot A_2$$

The applied switch-off value is therefore reduced or increased according to whether the slope of the actual-value curve is smaller or larger than the slope of the reference characteristic curve referred to the straight line region. The microprocessor 11 continuously compares the actual slope $A_0$ determined from the output signals of the angle sensor 4 and the torque sensor 3 with the corrected switch-off slope $A_{2corr}$. If $A_0$ drops off to the switch-off slope $A_{2corr}$, the fastener-driving operation is ended and the elastic limit in point X (FIG. 3 or FIG. 4) is again precisely reached, the point X being referred to the actual-value characteristic curve.

FIG. 5 illustrates the embodiment of the method according to case 2 with reference to the characteristic curves. The values $M_S$, $M_E$, $\phi_S$ and $\phi_E$ determine the slope $A_1$ of the reference characteristic curve 20 in its linear region. The switch-off slope $A_2$ determined in the preliminary tests is reached at point 21 of the characteristic curve at $M_X/\phi_X$.

The reference numeral 22 indicates the actual-value characteristic curve of a series driving of fasteners. If the characteristic curve 22 has a course with a steep slope $A_0$, the switch-off slope $A_2$ is corrected in correspondence to the corrective value $K=A_1/A_0$ so that the corrected switch-off slope is:

$$A_{2corr}=A_2/K=A_0/A_1\cdot A_2$$

The corrected switch-off slope $A_{2corr}$ can also be given as:

$$A_{2corr}=A_2+A_{corr}$$

as shown in FIG. 5. Because of this correction, a switch-off slope $A_{2corr}$ is determined and is characteristic for the steeper actual-value characteristic curve 22. The switch-off slope $A_{2corr}$ corresponds to the switch-off slope $A_2$ of the reference characteristic curve whereby it is established that also with this characteristic curve 22, which deviates from the reference characteristic curve 20, a driving of a fastener is obtained with the same strength values by reaching the switch-off point on the elastic limit.

The microprocessor 11 always determines the slope $A_0$ of the actual-value characteristic curve 22 when the threshold value $M_S$ is exceeded. Accordingly, the slope determined in this way can be used to directly and continuously monitor a fastener-driving operation with respect to a defective tightening. By providing tolerances of deviations, an error can be recognized in time. For example, if a predetermined maximum slope $A_{max}$ is exceeded, it can then be recognized that excessive friction values have occurred in the driving of a fastener, for example, under the head of the fastener or in the thread. The reasons for such a "chewing" of the head of the fastener or of the thread can be caused by inadequate lubrication or because of dust particles or, because a thread has been tapped improperly. The provision of a minimal slope $A_{min}$ is also possible for early failure detection whereby $A_{min}$ is preferably selected to be less than $A_2$. A tolerance range with reference to the reference characteristic curve 20 is limited by means of the slope values $A_{min}$ and $A_{max}$. The characteristic curves of proper fastener-driving operations must lie within this region. If the slope $A_0$ determined in the microprocessor 11 after the threshold value $M_S$ is exceeded is greater than $A_{max}$ or less than $A_{min}$, the fastener-driving operation can be interrupted already at its beginning. In this way, permanent damage to the workpieces which are to be connected can be prevented.

For example, if as shown in FIG. 2, a characteristic curve 23 climbs at a very steep slope from the threshold value $M_S$, the microprocessor can at this instant on the basis of the condition:

$$A_{(23)}>A_{max}$$

detect that an error which can lead to a poor fastener joint is present and the fastener-driving operation can be immediately interrupted. In this way, the error is already detected at the initial stage of the fastener-driving operation. If in contrast, as is the case with known methods, only a maximum torque $M_{max}$ is provided as a boundary value for detecting error, the error would in many cases first be detected when the components to be fastened together are already damaged. In many cases, an error cannot be detected without additional measures being taken if the characteristic curve 23, which is too steep, would fall off to the value $M_X$ before the value of the rotational torque $M_{max}$ is reached.

If the characteristic curve runs too flat such as the characteristic curve 24 in FIG. 2, the slope which corresponds to one which is too low can be determined from the condition:

$$A_{(24)}<A_{min}$$

The fastener-driving operation is then also interrupted in time. With the known methods, this error could have only been first detected if a predetermined maximum rotational angle $\phi_{max}$ had been exceeded.

In lieu of predetermined maximum slopes and minimum slopes or in addition to these values, it can also be advantageous to provide a maximum permissible corrective value or a minimum permissible corrective value where the determined corrective value K (as described above for predetermined minimum and maximum slopes) is compared with a predetermined corrective value and if this value is exceeded or the value drops beneath this value, an error signal is generated which activates an appropriate display.

It is also possible to provide a so-called acceptance window F (FIG. 5) which is determined by the predetermined values $M_{max}$, $M_{min}$, $\phi_{max}$ and $\phi_{min}$. Signals are present at the angle sensor 4 and the rotational torque sensor 3 when a control signal to switch off the fastener-driving tool occurs. The microprocessor 11 then compares these signals with predetermined minimum values and predetermined maximum values. If the point defined by both signals lies within the acceptance window F, the fastener-driving operation is in order. However, if the point lies outside of the acceptance window, then a fail signal is generated and displayed.

It is advantageous to combine failure detection by means of an acceptance window F with a failure recognition via predetermined maximum or minimum permissible slopes $A_{max}$ and $A_{min}$ so that a definitive error determination can be made when the threaded fastener connections are too tight or too loose as well as for threaded fasteners which have been chewed under the fastener head or in the winding. Threads which have not been correctly tapped as well as errors in the geometric dimensions of the thread can be definitively recognized in this manner.

Pursuant to a further embodiment of the method of the invention, the threaded fastener can be loosened or tightened by a predetermined angle after the control signal is generated and the fastener-driving operation is terminated. In this manner, it can be prevented that the threaded fastener becomes overstrained because of temperature increases in the parts to be connected, as for example, the standing studs for the crankcase housing and on the cylinder head of an internal combustion engine.

In the embodiment of the invention, the stress-strain characteristic of the actual fastener-driving operation is determined from the torque measured by means of the torque sensor 3 and from the rotational angle $\phi$ measured by means of the angle sensor 4. It can also be advantageous to determine the torque via a load current I of the motor of the fastener-driving tool. In addition, it can be advantageous to measure the time t instead of the rotational angle and thereby control the clock generator for measuring the torque M or the load current I. The stress-strain characteristic curve can therefore be determined in detail from the following variables:

$dM/d\phi$; $dM/dt$; $dI/d\phi$; $dI/dt$, where also stepwise difference quotients are measured instead of direct measurements of the differential quotients, that is, for example, $\Delta m/\Delta\phi$. Further, the actual slope can also be determined from the integral of the work which is performed.

In a further embodiment of the invention, a set of reference characteristic curves can be stored in the control arrangement 5 or in the computer connected to the interface unit 10. To each reference characteristic curve, a predetermined switch-off slope can be assigned which was determined pursuant to the method of FIG. 3 or FIG. 4. With the series production of threaded fastener connections, the actual slope $A_0$ is determined in the microprocessor 11 after the threshold value $M_S$ is exceeded. From the set of stored reference characteristic curves, the microprocessor then selects that reference characteristic curve whose characteristic slope $A_1$ corresponds to the measured actual slope $A_0$ or that which comes the closest thereto. The switch-off slope corresponding to the selected reference characteristic curve is now applied as a switch-off criteria. The microprocessor 11 compares the actual slope $A_0$ which is continuously determined with the switch-off slope of the selected reference characteristic curve in order to switch off the fastener-driving operation when the actual slope $A_0$ falls to this switch-off slope of the reference characteristic curve.

Pursuant to a further embodiment of the invention, the slope of the reference characteristic curve for several measuring points is provided. It can be advantageous to provide the slope of the reference characteristic curve at characteristic locations in dependence upon the rotational angle $\phi$ reached in each instance. In this way, an actual fastener-driving operation can be monitored by means of a comparison of the slope of the actual-value characteristic curve with the slope of the reference characteristic curve at characteristic locations thereof in dependence upon the rotational angle $\phi$ reached in each instance.

Figure 6:
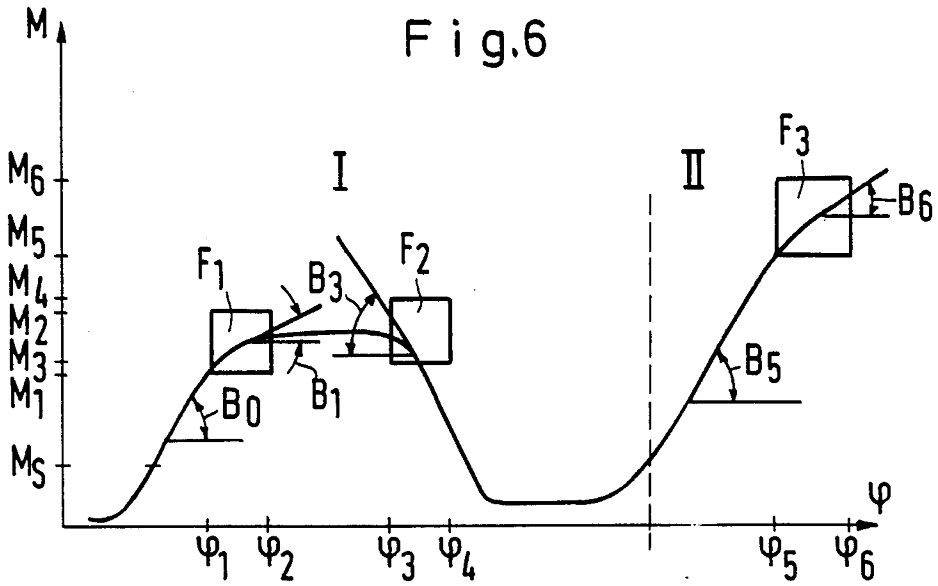

FIG. 6 shows the characteristic curve of a fastener connection wherein the threaded fastener is provided with a self-tapping winding. In the first region II at the ascending branch with slope $B_0$, the torque M is increased to the full cutting torque. Window $F_1$ is given by parameters $M_1$, $\phi_1$, $M_2$, $\phi_2$, the slope $B_1$ drops almost to zero. The region of the characteristic which is approximately horizontal between the windows $F_1$ and $F_2$ corresponds to the tapping process. Finally, the winding is completely tapped in window $F_2$ and the slope $B_3$ of the characteristic curve becomes negative and the torque falls down to almost zero. The window $F_2$ is determined by parameters $M_3$, $\phi_3$, $M_4$, $\phi_4$. After passing through an undetermined region, the characteristic curve reaches region II and the tightening operation illustrated in FIG. 5 begins and is shown to have the slope $B_5$. The fastener-driving operation is terminated after the fall of the slope to the switch-off slope $B_6$ in window $F_3$. The window $F_3$ is defined by the parameters $M_5$, $\phi_5$, and $M_6$, $\phi_6$. If the characteristic acceptance windows $F_1$ to $F_3$ shown in FIG. 6 as well as the corresponding slopes $B_0$ to $B_6$ of a reference characteristic curve are provided, then every fastener-driving operation (dependent upon rotational angle) for such a fastener case can be monitored and controlled as well as timely interrupted in response to the occurrence of an error. The rotational angle dependent provision of several slopes of a reference characteristic curve can be transformed to the actual-value characteristic curve of an actual fastener-driving operation which departs from the reference characteristic curve by means of a corrective value K in order to compensate for the departure from the reference characteristic curve. This method is likewise carried out by means of the control arrangement 5 by which simply another program has to be placed in the program memory 15 and the necessary values have to be read into the memory 13.

The failure indication can be optically displayed on an external lamp table and/or it can be announced by means of a binary coding of the central control. Further, it is also possible to provide an indication on a screen of the microprocessor as well as to transmit the failure indication via the input-output unit 10 to a printer or computer for statistical evaluation.

It is understood that the foregoing description is that of the preferred embodiments of the invention and that various changes and modifications may be made thereto without departing from the spirit and scope of the invention as defined in the appended claims.

What is claimed is:

1. A method of tightening threaded fasteners with a controlled fastener driving tool wherein said tightening is controlled by the elastic limit, the method comprising the steps of:

continuously determining the slope of a characteristic curve corresponding to a stress-strain characteristic as an actual value;

comparing said actual value with a predetermined slope determined in preliminary tests for a characteristic fastener driving case; and, generating a control signal for terminating the fastener driving operation upon reaching said predetermined slope; and, the further steps of:

storing the slope ($A_1$, $A_2$) of the characteristic curve of a characteristic fastener driving operation as a reference characteristic curve over its entire course, said reference characteristic curve having a linear slope portion ($A_1$);

determining the slope ($A_0$) in the straight portion of the actual-value characteristic curve;

comparing the slope ($A_0$) of the actual-value characteristic curve with the linear slope ($A_1$) of the reference characteristic curve;

generating a corrective value (K) corresponding to the difference between said slopes ($A_0$) and ($A_1$);

utilizing said corrective value to transform one of said slopes ($A_0$, $A_2$) to a characteristic value, said one slope being significant for switching-off the fastener driving operation; and, evaluating said last-mentioned characteristic value for switching off said fastener driving operation.

2. The method of claim 1, comprising the step of transforming the predetermined switch-off slope ($A_2$) by means of said corrective value to a characteristic value ($A_{2corr}$) corresponding to the actual-value characteristic curve.

3. The method of claim 1, comprising the step of transforming the measured linear slope ($A_0$) of the actual-value characteristic curve by means of the corrective value (K) to the reference characteristic curve.

4. The method of claim 1, comprising the step of comparing the determined slope ($A_0$) of the actual-value characteristic curve with predetermined minimal and maximum slope values ($A_{max}$, $A_{min}$); and, interrupting the fastener driving operation if said values are exceeded or fallen short of and generating an error signal.

5. The method of claim 1, wherein an acceptance window is defined by a maximum and a minimum torque ($M_{max}$, $M_{min}$) and a maximum and a minimum rotational angle ($\phi_{max}$, $\phi_{min}$) and wherein the method comprises the further step of generating an error signal if the values for rotational angle ($\phi$) and torque (M) present when the fastener driving operation is ended lie outside of their predetermined permissible minimal and maximum values.

6. The method of claim 5, wherein the nature of the error is indicated with the aid of said generated error signal.

7. The method of claim 5, wherein the fastener is tightened or loosened after the control signal is generated.

8. A method of tightening threaded fasteners with a controlled fastener driving tool wherein said tightening is controlled by the elastic limit, the method comprising the steps of:

continuously determining the slope of a characteristic curve corresponding to a stress-strain characteristic as an actual value;

comparing said actual value with a predetermined slope determined in preliminary tests for a characteristic fastener driving case;

generating a control signal for terminating the fastener driving operation upon reaching said predetermined slope;

storing the slopes of characteristic curves of several characteristic fastener cases as reference characteristic curves over their entire respective courses;

assigning the slope determined in the straight portion of the actual-value characteristic curve by comparing those of said stored reference characteristic curves whose linear slope ($A_1$) comes closest to the slope ($A_0$) of the acutal-value characteristic curve; and, evaluating the switch-off slope ($A_2$) of these reference characteristic curves as a switch-off criteria.

9. The method of claim 8, comprising the steps of:

assigning different characteristic slopes ($B_0$ to $B_6$) to the reference characteristic curve in dependence upon the rotational angle ($\phi$); and, comparing said slopes ($B_0$ to $B_6$) to the slopes of the actual-value characteristic curve determined at corresponding rotational angles for monitoring and controlling a fastener driving operation.

10. The method of claim 8, wherein the switch-off slope ($A_2$) of the reference characteristic curve is determined as a proportional value or as a difference value to the slope ($A_1$) in the linear region of the reference characteristic curve.

11. The method of claim 8, wherein the switch-off slope ($A_2$) of the reference characteristic curve is determined pursuant to the percentage portion of the permanent deformation of the total length of the fastener (0.2% strain limit).

* * * * *

UNITED STATES PATENT AND TRADEMARK OFFICE
CERTIFICATE OF CORRECTION

PATENT NO. : 4,685,050

DATED : August 4, 1987

INVENTOR(S) : Bernhard Polzer and Johann Roemischer

It is certified that error appears in the above-identified patent and that said Letters Patent is hereby corrected as shown below:

In column 4, line 24: delete "with" and substitute -- which -- therefor.

In column 5, line 54: delete "FIG, 3" and substitute -- FIG. 3 -- therefor.

In column 5, line 63: delete "swltch-off" and substitute -- switch-off -- therefor.

In column 6, line 21: after the word "cycles", please delete the numeral "4".

In column 7, line 12: add a comma after the word "reached".

Signed and Sealed this

Ninth Day of February, 1988

*Attest:*

DONALD J. QUIGG

*Attesting Officer*

*Commissioner of Patents and Trademarks*